United States Patent
He

(10) Patent No.: US 9,714,038 B1
(45) Date of Patent: Jul. 25, 2017

(54) METHOD AND DEVICE FOR WARNING AGAINST VEHICLE WATER WADING

(71) Applicant: BAIDU ONLINE NETWORK TECHNOLOGY (BEIJING) CO., LTD., Beijing (CN)

(72) Inventor: Jun He, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/281,044

(22) Filed: Sep. 29, 2016

(30) Foreign Application Priority Data

May 17, 2016 (CN) .......................... 2016 1 0325896

(51) Int. Cl.
```
B60W 50/14     (2012.01)
H04L 29/08     (2006.01)
G01C 13/00     (2006.01)
G01S 17/87     (2006.01)
G08B 21/18     (2006.01)
B60W 30/18     (2012.01)
```

(52) U.S. Cl.
CPC ...... B60W 50/14 (2013.01); B60W 30/18009 (2013.01); G01C 13/008 (2013.01); G01S 17/87 (2013.01); G08B 21/182 (2013.01); H04L 67/12 (2013.01); B60W 2050/143 (2013.01)

(58) Field of Classification Search
CPC ..... B60W 50/14; G01F 23/292; G01C 13/008
See application file for complete search history.

(56) References Cited

U.S. PATENT DOCUMENTS

| | | | |
|---|---|---|---|
| 6,650,244 B1 | 11/2003 | Chen et al. | |
| 2013/0024100 A1* | 1/2013 | Claudel | G08G 1/0116 701/117 |

FOREIGN PATENT DOCUMENTS

| CN | 204821318 U | 12/2015 |
|---|---|---|
| CN | 105291973 A | 2/2016 |

OTHER PUBLICATIONS

Chinese Office Action and Search Report dated Jan. 3, 2017 for Chinese Patent application No. 201610325896.X with English translation from Global Dossier.

(Continued)

*Primary Examiner* — Curtis Odom
(74) *Attorney, Agent, or Firm* — Ladas & Parry, LLP

(57) ABSTRACT

The invention provides a method and device for warning against vehicle water wading. The method comprises: measuring a water depth at a predetermined distance in front of a vehicle, based on respective measuring results of a vehicle bottom laser rangefinder, an ultrasonic rangefinder, a vehicle roof laser rangefinder, and a gyro sensor; determining whether the water depth exceeds a safe depth of the vehicle; issuing a vehicle warning message if the water depth exceeds the safe depth. The invention also provides a corresponding device of the method. Compared with the prior art solution in which it is only possible to detect the water depth and issue any warning message after the vehicle wades into the water, the solution of the present embodiment may detect the water depth at a predetermined distance in front of the vehicle before the vehicle wades into the water and issue warning message if the water depth exceeds the safety depth of the vehicle, which improves the efficiency of the vehicle water wading warning, and thus carries out water wading warning in a real sense.

11 Claims, 3 Drawing Sheets

(56) References Cited

OTHER PUBLICATIONS

Decision of Rejection dated Mar. 14, 2017 for Chinese Patent application No. 201610325896.X with google translation.

* cited by examiner

METHOD AND DEVICE FOR WARNING AGAINST VEHICLE WATER WADING

CROSS-REFERENCE TO RELATED APPLICATION

This application claims the priority to and the benefit of Chinese Patent Application No. 201610325896.X filed on May 17, 2016, the disclosure of which is incorporated herein by reference in its entirety.

TECHNICAL FIELD

The present invention relates to the field of vehicle safety technology, and more particularly to a method and device for warning against vehicle water wading.

BACKGROUND

Typically, after a heavy rain, the drainage fails to timely drain water, resulting in concave sections with a lot of water. When a vehicle passes through the concave sections, if the water depth is too deep, it will cause the vehicle a flameout and trap vehicle in the water, leading to some property damage. More seriously, when the vehicle encounters a flameout, the doors will not open, the driver is likely to face life-threatening situation, so warning against water wading becomes particularly important.

The existing solution for warning against vehicle water wading usually makes detection and warning after a vehicle wades into water. At a time when the water depth is too deep and the vehicle has not been timely warned, it may lead to a flameout and trap the vehicle in the water. The existing solution for warning against vehicle water wading is therefore low in efficiency and can not do the warning in a real sense.

SUMMARY

The present invention provides a method and device for warning against vehicle water wading to improve the efficiency of vehicle water wading warning, offering a vehicle water wading warning in a real sense.

The present invention provides a method for warning against vehicle water wading, wherein the method comprises:

measuring a water depth at a predetermined distance in front of a vehicle, based on respective measuring results of a vehicle bottom laser rangefinder, an ultrasonic rangefinder, a vehicle roof laser rangefinder, and a gyro sensor;

determining whether the water depth exceeds a safe depth of the vehicle;

issuing a vehicle warning message if the water depth exceeds the safe depth.

Further alternative, in the aforementioned method, before the step of measuring a water depth at a predetermined distance in front of a vehicle, based on respective measuring results of a vehicle bottom laser rangefinder, an ultrasonic rangefinder, a vehicle roof laser rangefinder, and a gyro sensor, the method further comprises:

measuring, with the vehicle bottom laser rangefinder, a first distance between the vehicle bottom laser rangefinder and the surface of the road, the vehicle bottom laser rangefinder being arranged at the bottom of the vehicle, and the laser beam down from the vehicle bottom laser rangefinder being emitted perpendicular to the bottom of the vehicle;

measuring, with the ultrasonic rangefinder, a second distance between the ultrasonic rangefinder and the surface of the water, the ultrasonic rangefinder being also arranged at the bottom of the vehicle, and the ultrasonic wave down from the ultrasonic rangefinder being also emitted perpendicular to the bottom of the vehicle, and the vehicle bottom laser rangefinder and the ultrasonic rangefinder being arranged in a straight line parallel to the front of the vehicle;

measuring, with the vehicle roof laser rangefinder, a third distance between the vehicle roof laser rangefinder and the surface of the road ahead at the predetermined distance, the laser beam from the vehicle roof laser rangefinder forming a certain angle with the perpendicular direction of the vehicle;

measuring, with the gyro sensor, the slope angle of the road, the gyro sensor being arranged in the vehicle;

wherein the step of measuring a water depth at a predetermined distance in front of a vehicle, based on respective measuring results of a vehicle bottom laser rangefinder, an ultrasonic rangefinder, a vehicle roof laser rangefinder, and a gyro sensor specifically comprises:

measuring the water depth at the predetermined distance in front of the vehicle based on the first distance, the second distance, the third distance, a fourth distance between the projection of vehicle roof laser rangefinder in the bottom of the vehicle and the straight line where the vehicle bottom laser rangefinder and the ultrasonic rangefinder are arranged, the slope angle, and the angle between the laser beam from the vehicle roof laser rangefinder and the perpendicular direction of the vehicle.

Further alternative, in the aforementioned method, the step of measuring the water depth at the predetermined distance in front of the vehicle based on the first distance, the second distance, the third distance, a fourth distance between the projection of vehicle roof laser rangefinder in the bottom of the vehicle and the straight line where the vehicle bottom laser rangefinder and the ultrasonic rangefinder are arranged, the slope angle, and the angle between the laser beam from the vehicle roof laser rangefinder and the perpendicular direction of the vehicle specifically comprises:

calculating, based on the first distance and the second distance, a first reference distance $L1=X1-X2$, in which $X1$ is the first distance and $X2$ is the second distance;

calculating, based on the first distance $L1$ and the slope angle, a second reference distance $L2=L1/\tan\theta$, in which $\theta$ is the slope angle;

calculating, based on the third distance and the angle between the laser beam from the vehicle roof laser rangefinder and the perpendicular direction of the vehicle, a third reference distance $L3$, $L3=X3/\sin\theta_1$, in which $X3$ is the third distance, and $\theta_1$ is the angle between the laser beam from the vehicle roof laser rangefinder and the perpendicular direction of the vehicle;

calculating, based on the $L2/(L3-X4)=L1/L4$, a fourth reference distance $L4$, in which $X4$ is the fourth distance between the projection of vehicle roof laser rangefinder in the bottom of the vehicle and the straight line where the vehicle bottom laser rangefinder and the ultrasonic rangefinder are arranged;

calculating, based on the fourth reference distance $L4$ and the slope angle, the water depth at the predetermined distance in front of the vehicle $L0=L4\times\cos\theta$.

Further alternative, in the aforementioned method, the step of issuing a vehicle warning message comprises:

issuing a vehicle warning message in the form of voice.

Further alternative, in the aforementioned method, after the step of issuing a vehicle warning message, the method further comprises at least one of the following operations:

controlling the vehicle to stop moving ahead; and broadcasting the vehicle warning message via a vehicle network broadcasting module, so as to inform other vehicles about the vehicle warning message.

The present invention further provides a device for warning against vehicle water wading, wherein the device comprises: a vehicle bottom laser rangefinder, an ultrasonic rangefinder, a vehicle roof laser rangefinder, a gyro sensor, a processing module, a determining module, and a warning module;

the processing module is used for measuring a water depth at a predetermined distance in front of a vehicle, based on respective measuring results of the vehicle bottom laser rangefinder, the ultrasonic rangefinder, the vehicle roof laser rangefinder, and the gyro sensor;

the determining module is used for determining whether the water depth exceeds a safe depth of the vehicle;

the warning module is used for issuing a vehicle warning message if the water depth exceeds the safe depth.

Further alternative, in the aforementioned device:

the vehicle bottom laser rangefinder is used for measuring a first distance between the vehicle bottom laser rangefinder and the surface of the road, the vehicle bottom laser rangefinder being arranged at the bottom of the vehicle, and the laser beam down from the vehicle bottom laser rangefinder being emitted perpendicular to the bottom of the vehicle;

the ultrasonic rangefinder is used for measuring a second distance between the ultrasonic rangefinder and the surface of the water, the ultrasonic rangefinder being also arranged at the bottom of the vehicle, and the ultrasonic wave down from the ultrasonic rangefinder being also emitted perpendicular to the bottom of the vehicle, and the vehicle bottom laser rangefinder and the ultrasonic rangefinder being arranged in a straight line parallel to the front of the vehicle;

the vehicle roof laser rangefinder is used for measuring a third distance between the vehicle roof laser rangefinder and the surface of the road ahead at the predetermined distance, the laser beam from the vehicle roof laser rangefinder forming a certain angle with the perpendicular direction of the vehicle;

the gyro sensor is used for measuring the slope angle of the road, the gyro sensor being arranged in the vehicle;

the processing module is specifically used for calculating the water depth at the predetermined distance in front of the vehicle based on the first distance, the second distance, the third distance, a fourth distance between the projection of vehicle roof laser rangefinder in the bottom of the vehicle and the straight line where the vehicle bottom laser rangefinder and the ultrasonic rangefinder are arranged, the slope angle, and the angle between the laser beam from the vehicle roof laser rangefinder and the perpendicular direction of the vehicle.

Further alternative, in the aforementioned device, the processing module is specifically used for:

calculating, based on the first distance and the second distance, a first reference distance $L1=X1-X2$, in which $X1$ is the first distance and $X2$ is the second distance;

calculating, based on the first distance $L1$ and the slope angle, a second reference distance $L2=L1/\tan\theta$, in which $\theta$ is the slope angle;

calculating, based on the third distance and the angle between the laser beam from the vehicle roof laser rangefinder and the perpendicular direction of the vehicle, a third reference distance $L3$, $L3=X3/\sin\theta_1$, in which $X3$ is the third distance, and $\theta_1$ is the angle between the laser beam from the vehicle roof laser rangefinder and the perpendicular direction of the vehicle;

calculating, based on the $L2/(L3-X4)=L1/L4$, a fourth reference distance $L4$, in which $X4$ is the fourth distance between the projection of vehicle roof laser rangefinder in the bottom of the vehicle and the straight line where the vehicle bottom laser rangefinder and the ultrasonic rangefinder are arranged;

calculating, based on the fourth reference distance $L4$ and the slope angle, the water depth at the predetermined distance in front of the vehicle $L0=L4\times\cos\theta$.

Further alternative, in the aforementioned device, the warning module is specifically used for:

issuing a vehicle warning message in the form of voice.

Further alternative, in the aforementioned device, the device further comprises at least one of the following modules:

a controlling module used for controlling the vehicle to stop moving ahead; and a vehicle network broadcasting module used for broadcasting the vehicle warning message via a vehicle network broadcasting module, so as to inform other vehicles about the vehicle warning message.

With the aforementioned technical solutions, the method and device for warning against vehicle water wading of the present invention may detect the water depth at a predetermined distance in front of the vehicle and issue a vehicle warning message if the water depth exceeds the safety depth of the vehicle. Compared with the prior art solution in which it is only possible to detect the water depth and issue any warning message after the vehicle wades into the water, the solution of the present embodiment may detect the water depth at a predetermined distance in front of the vehicle before the vehicle wades into the water and issue warning message if the water depth exceeds the safety depth of the vehicle, which improves the efficiency of the vehicle water wading warning, and thus carries out water wading warning in a real sense. And further, it is also possible to directly control the vehicle to stop moving to ensure the safety of the vehicle and the personnel on the vehicle. Still further, one can broadcast the vehicle warning message via a vehicle network broadcasting module, so as to inform other vehicles about the vehicle warning message and thus help other vehicles to avoid the risk of water wading.

DETAILED DESCRIPTION

To make the object, technical solutions, and advantages of the present invention more apparent, we will describe the present invention below in detail in conjunction with the accompanying drawings and specific embodiments.

Figure 1:
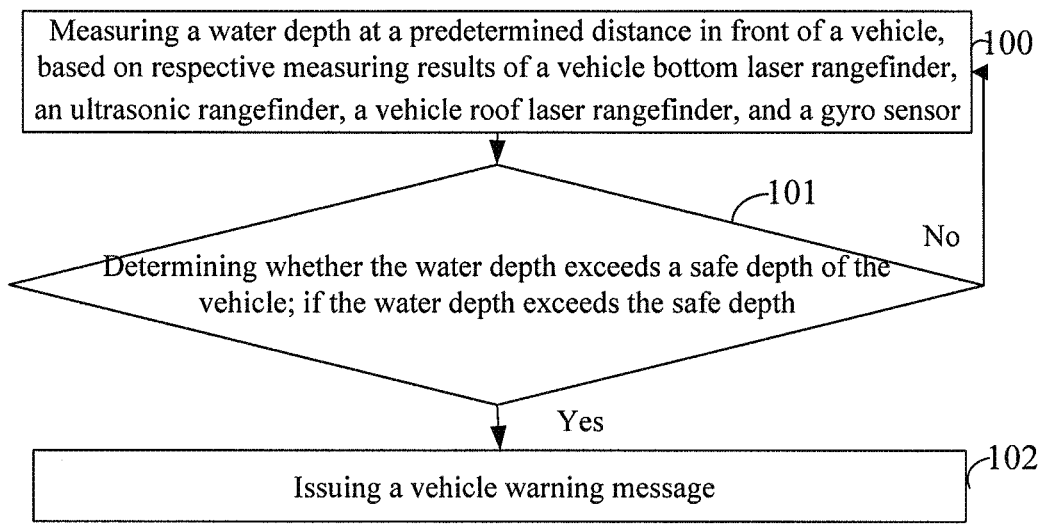
FIG. 1 is the flowchart of an embodiment of the method for warning against vehicle water wading of the present invention.

FIG. 1 is the flowchart of an embodiment of the method for warning against vehicle water wading of the present invention. As shown in FIG. 1, a method for warning against vehicle water wading according to the embodiment is characterized in that the method comprises:

100, measuring a water depth at a predetermined distance in front of a vehicle, based on respective measuring results of a vehicle bottom laser rangefinder, an ultrasonic rangefinder, a vehicle roof laser rangefinder, and a gyro sensor.

In this embodiment, two laser rangefinders, an ultrasonic rangefinder, and a gyro sensor are used totally to achieve, together, measuring a water depth at a predetermined distance in front of a vehicle. Herein, one of the two laser rangefinders is arranged on the roof of the vehicle, i.e. the vehicle roof laser rangefinder; and the other is arranged at the bottom of the vehicle, i.e., the vehicle bottom laser rangefinder.

Figure 2:
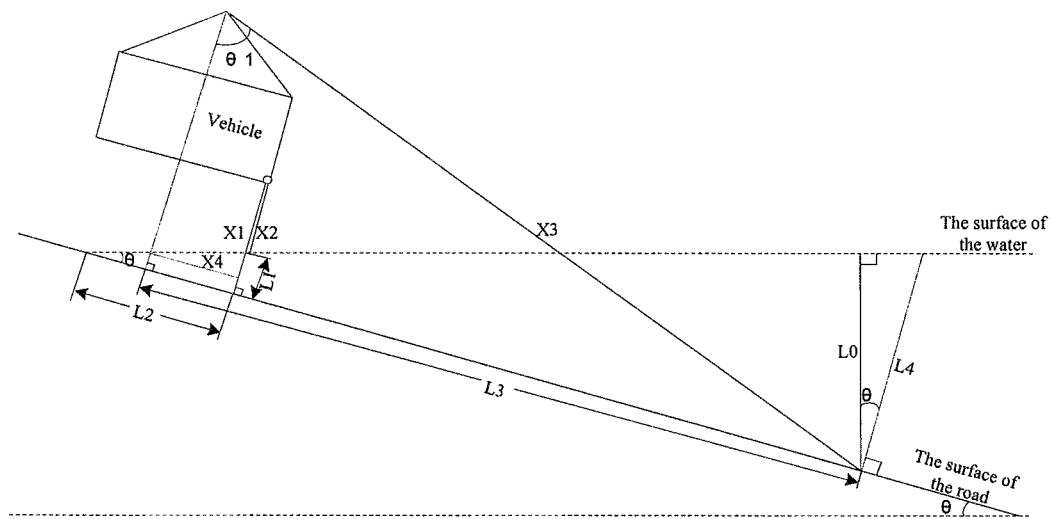
FIG. 2 is an illustrative diagram for the principle of measuring a water depth at a predetermined distance in front of a vehicle.

For example, FIG. 2 is an illustrative diagram for the principle of measuring a water depth at a predetermined distance in front of a vehicle. As shown in FIG. 2, in the embodiment, the vehicle bottom laser rangefinder is arranged at the bottom of the vehicle, and the laser beam down from the vehicle bottom laser rangefinder is emitted perpendicular to the bottom of the vehicle, the vehicle bottom laser rangefinder can measure a first distance X1 between the vehicle bottom laser rangefinder and the surface of the road; the ultrasonic rangefinder is also arranged at the bottom of the vehicle, and the ultrasonic wave down from the ultrasonic rangefinder is also emitted perpendicular to the bottom of the vehicle; and the vehicle bottom laser rangefinder and the ultrasonic rangefinder being arranged in a straight line parallel to the front of the vehicle; the ultrasonic rangefinder measures a second distance X2 between the ultrasonic rangefinder and the surface of the water. The view shown in FIG. 2 can be a sectional view, in the figure as shown in FIG. 2, the vehicle bottom laser rangefinder and the ultrasonic rangefinder overlap with each other, both are arranged in a plane at the bottom of the vehicle, and both measure distances downward from the bottom and perpendicularly to the bottom of the vehicle. As shown in FIG. 2, there is an angle $\theta_1$ between the laser beam from the vehicle roof laser rangefinder and the perpendicular direction of the vehicle; a fourth distance between the projection of vehicle roof laser rangefinder in the bottom of the vehicle and the straight line where the vehicle bottom laser rangefinder and the ultrasonic rangefinder are arranged is signified as X4; a third distance between the vehicle roof laser rangefinder and the surface of the road ahead at the predetermined distance is X3. A gyro sensor is arranged in the vehicle, for measuring the slope angle $\theta$ of the road. The gyro sensor detects the slope angle of the road where the vehicle is currently traveling, for example, when the vehicle is traveling in a horizontal direction, the gyro sensor measures a slope angle of $\theta$ degree, while the vehicle is traveling on the road with a slope, the gyro sensor can detect the angle of inclination, i.e., the slope angle $\theta$ of the road.

Next, the water depth at the predetermined distance in front of the vehicle is measured based on the first distance X1 measured by the vehicle bottom laser rangefinder, the second distance X2 measured by the ultrasonic rangefinder measures, the third distance X3 measured by the vehicle roof laser rangefinder, the fourth distance X4 between the projection of vehicle roof laser rangefinder in the bottom of the vehicle and the straight line where the vehicle bottom laser rangefinder and the ultrasonic rangefinder are arranged, the slope angle $\theta$ measured by the gyro sensor, and the angle $\theta_1$ between the laser beam from the vehicle roof laser rangefinder and the perpendicular direction of the vehicle.

For example, the specific implementation of the step may comprise the steps of:

(1) calculating, based on the first distance X1 and the second distance X2, a first reference distance L1=X1−X2;

(2) calculating, based on the first distance L1 and the slope angle $\theta$, a second reference distance L2=L1/tan $\theta$;

(3) calculating, based on the third distance L3 and the angle $\theta$, between the laser beam from the vehicle roof laser rangefinder and the perpendicular direction of the vehicle, a third reference distance L3, L3=X3/sin $\theta_1$;

(4) calculating the fourth reference distance L4 based on the first reference distance L1, the second reference distance L2, the third reference distance L3, and the fourth reference distance X4 between the projection of vehicle roof laser rangefinder in the bottom of the vehicle and the straight line where the vehicle bottom laser rangefinder and the ultrasonic rangefinder are arranged and in conjunction with their relationships;

(5) calculating, based on the fourth reference distance L4 and the slope angle, the water depth at the predetermined distance in front of the vehicle L0=L4×cos $\theta$.

As should be noted, in the embodiment, the beam from the vehicle roof laser rangefinder is emitted at an angle $\theta_1$ with respect to the perpendicular direction of the vehicle and is irradiated to a certain spot on the road in front of the vehicle. According to principle of Trigonometry, as shown in FIG. 2, one can see that the vehicle roof laser rangefinder can irradiate at a location at a third reference distance L3 in front of the vehicle, in the embodiment, the water depth at a predetermined distance in front of the vehicle refers to the water depth at the location at the third reference distance L3 in front of the vehicle. Implementation of steps (1)-(5) of the embodiment can be realized through referring to the computational characteristics of a right triangle.

It should be noted that in the present embodiment, the angle $\theta_1$ between the laser beam from the vehicle roof laser rangefinder and the perpendicular direction of the vehicle can be adjusted according to the predetermined distance in front of the vehicle to be detected; when the predetermined distance to be detected becomes larger, the angle $\theta_1$ between the laser beam from the vehicle roof laser rangefinder and the perpendicular direction can be adjusted larger; when predetermined distance to be detected becomes smaller, the angle $\theta_1$ between the laser beam from the vehicle roof laser rangefinder and the perpendicular direction can be adjusted smaller. In practice, selection of the predetermined distance can be adjusted according to actual needs of each type of vehicle, for a preferred distance that guarantees the safety of a vehicle during reverse driving without water pouring in.

The above-described embodiment provide an example of measuring a water depth at a predetermined distance in front of a vehicle, based on respective measuring results of a vehicle bottom laser rangefinder, an ultrasonic rangefinder, a vehicle roof laser rangefinder, and a gyro sensor. In practice, one can also adjust, based on the actual situation, the respective measuring directions, measuring objects, and positioning of the vehicle roof laser rangefinder, the vehicle bottom laser rangefinder, and the ultrasonic rangefinder, so as to measure the water depth at a predetermined distance in front of a vehicle in other ways.

101, determining whether the water depth exceeds a safe depth of the vehicle; if the water depth exceeds the safe depth, executing 102, otherwise, continuing to execute 100.

In this embodiment, the safety depth of the vehicle may be the maximum water depth a vehicle can handle, e.g., it can be taken, according to the actual needs, 10 cm plus the vertical height of the exhaust port of the vehicle from the ground.

When the water depth does not exceed the safe depth of the vehicle, one can return to step 100 to continue the detection.

102, issuing a vehicle warning message.

In the embodiment, when the water depth at a predetermined distance in front of the vehicle exceeds the safe depth of the vehicle and it is determined that the vehicle will face the risk of water pouring in upon moving further into the water, a vehicle warning message may be issued. For example, one can directly issue the warning message or issue the message by voice. The message can be, for example, "Water depth reaching Y cm ahead at a predetermined X meters; Danger ahead, please stop moving immediately." The vehicle can then back from the section of the road with water and choose other safe route.

Further, after issuing the vehicle warning message, one can also control the vehicle to stop moving, in order to fully guarantee the security of the vehicle. At the same time, if the vehicle joined the vehicle network, one can broadcast the vehicle warning message via a vehicle network broadcasting module, so as to inform other vehicles about the vehicle warning message and thus help other vehicles to avoid the risk of water wading. The solution can be used on both unmanned vehicles and manned vehicles. For an unmanned vehicle, after the warning message being issued, the vehicle can be directly controlled to stop moving. For a manned vehicle, one may further monitor whether the vehicle is stopped, if the vehicle is not stopped, the warning message can be issued again, and the vehicle can be controlled to stop moving to ensure the safety of the personnel on the vehicle.

With the aforementioned technical solutions, the method for warning against vehicle water wading of the present embodiment may detect the water depth at a predetermined distance in front of the vehicle and issue a vehicle warning message if the water depth exceeds the safety depth of the vehicle. Compared with the prior art solution in which it is only possible to detect the water depth and issue any warning message after the vehicle wades into the water, the solution of the present embodiment may detect the water depth at a predetermined distance in front of the vehicle before the vehicle wades into the water and issue warning message if the water depth exceeds the safety depth of the vehicle, which improves the efficiency of the vehicle water wading warning, and thus carries out water wading warning in a real sense. And further, it is also possible to directly control the vehicle to stop moving to ensure the safety of the vehicle and the personnel on the vehicle. Still further, one can broadcast the vehicle warning message via a vehicle network broadcasting module, so as to inform other vehicles about the vehicle warning message and thus help other vehicles to avoid the risk of water wading.

Figure 3:
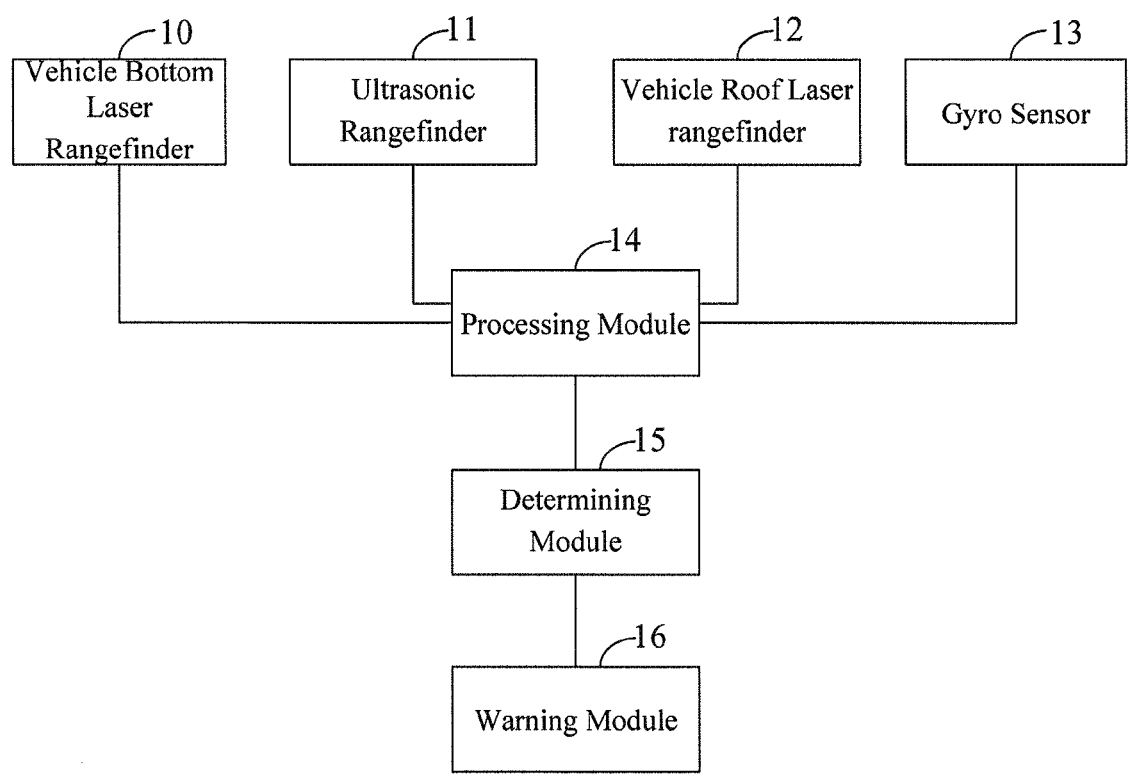
FIG. 3 is the structural diagram of a first embodiment of the warning device for vehicle water wading of the present invention.

FIG. 3 is the structural diagram of a first embodiment of the warning device for vehicle water wading of the present invention. As shown in FIG. 3, a device for warning against vehicle water wading according to the embodiment can specifically comprise: a vehicle bottom laser rangefinder 10, an ultrasonic rangefinder 11, a vehicle roof laser rangefinder 12, a gyro sensor 13, a processing module 14, a determining module 15, and a warning module 16.

The processing module 14 is respectively connected to the vehicle bottom laser rangefinder 10, the ultrasonic rangefinder 11, the vehicle roof laser rangefinder 12, and the gyro sensor 13, and is used for measuring a water depth at a predetermined distance in front of a vehicle, based on respective measuring results of the vehicle bottom laser rangefinder 10, the ultrasonic rangefinder 11, the vehicle roof laser rangefinder 12, and the gyro sensor 13; the determining module 15 is used for determining whether the water depth exceeds a safe depth of the vehicle; the warning module 16 is used for issuing a vehicle warning message if the water depth is determined by the determining module 15 to exceed the safe depth.

Further alternatively, the vehicle bottom laser rangefinder 10 is used for measuring a first distance between the vehicle bottom laser rangefinder 10 and the surface of the road, the vehicle bottom laser rangefinder 10 is arranged at the bottom of the vehicle, and the laser beam down from the vehicle bottom laser rangefinder 10 is emitted perpendicular to the bottom of the vehicle.

Further alternatively, the ultrasonic rangefinder 11 is used for measuring a second distance between the ultrasonic rangefinder 11 and the surface of the water, the ultrasonic rangefinder 11 is also arranged at the bottom of the vehicle, and the ultrasonic wave down from the ultrasonic rangefinder 11 is also emitted perpendicular to the bottom of the vehicle, and the vehicle bottom laser rangefinder 10 and the ultrasonic rangefinder 11 is arranged in a straight line parallel to the front of the vehicle.

The vehicle roof laser rangefinder 12 is used for measuring a third distance between the vehicle roof laser rangefinder and the surface of the road ahead at the predetermined distance, the laser beam from the vehicle roof laser rangefinder 12 forms a certain angle $\theta_1$ with the perpendicular direction of the vehicle.

The gyro sensor 13 is used for measuring the slope angle of the road, the gyro sensor 13 is arranged in the vehicle.

The processing module 14 is specifically used for measuring the water depth at the predetermined distance in front of the vehicle based on the first distance measured by the vehicle bottom laser rangefinder 10, the second distance measured by the ultrasonic rangefinder 11, the third distance measure by the vehicle roof laser rangefinder 12, a fourth distance between the projection of vehicle roof laser rangefinder 12 in the bottom of the vehicle and the straight line where the vehicle bottom laser rangefinder 10 and the ultrasonic rangefinder 11 are arranged, the slope angle, and the angle between the laser beam from the vehicle roof laser rangefinder 12 and the perpendicular direction of the vehicle.

Further alternatively, in the device for warning against vehicle water wading of the embodiment, the processing module 14 is used for:

calculating, based on the first distance and the second distance, a first reference distance $L1=X1-X2$, in which X1 is the first distance and X2 is the second distance;

calculating, based on the first distance L1 and the slope angle, a second reference distance $L2=L1/\tan\theta$, in which $\theta$ is the slope angle;

calculating, based on the third distance and the angle between the laser beam from the vehicle roof laser rangefinder and the perpendicular direction of the vehicle, a third reference distance L3, $L3=X3/\sin\theta_1$, in which L3 is the third reference distance, and $\theta_1$ is the angle between the laser beam from the vehicle roof laser rangefinder and the perpendicular direction of the vehicle;

calculating, based on the $L2/(L3-X4)=L1/L4$, a fourth reference distance L4, in which X4 is the fourth distance between the projection of vehicle roof laser rangefinder in the bottom of the vehicle and the straight line where the vehicle bottom laser rangefinder and the ultrasonic rangefinder are arranged;

calculating, based on the fourth reference distance L4 and the slope angle, the water depth at the predetermined distance in front of the vehicle L0=L4×cos θ.

Further alternatively, the warning module is specifically used for: issuing a vehicle warning message in the form of voice.

Figure 4:
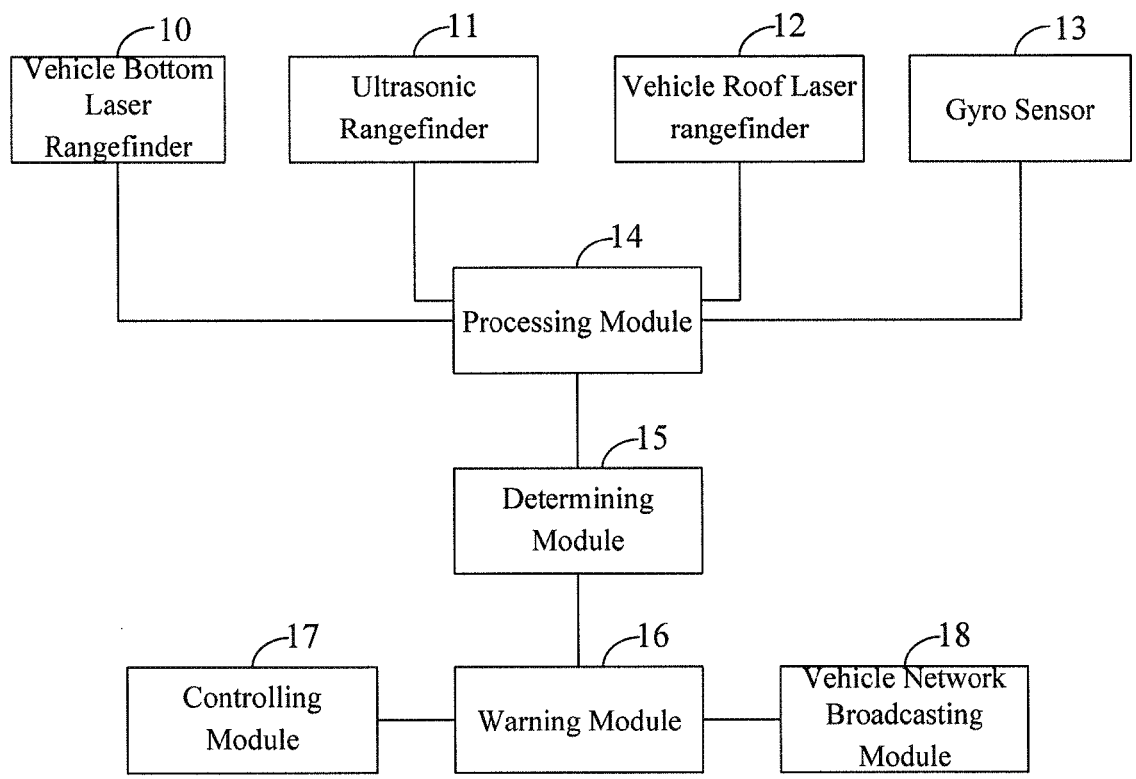
FIG. 4 is the structural diagram of a second embodiment of the warning device for vehicle water wading of the present invention.

FIG. 4 is the structural diagram of a second embodiment of the warning device for vehicle water wading of the present invention. As shown in FIG. 4, on the basis of the embodiment shown in FIG. 3, the device for warning against vehicle water wading of this embodiment may further comprise at lease one of the following modules:

a controlling module 17 used for controlling the vehicle to stop moving ahead based on the vehicle waning message from the warning module 16; and a vehicle network broadcasting module 18 used for broadcasting, based on the vehicle waning message from the warning module 16, the vehicle warning message via a vehicle network broadcasting module, so as to inform other vehicles about the vehicle warning message.

The embodiment as shown in FIG. 4 comprises both the control module 17 and the vehicle network broadcasting module for the sake of illustration; in practice, the device can include only one of them based on actual needs.

The device for warning against vehicle water wading in the above embodiments achieves the technical solution of warning against vehicle water wading with the aforementioned modules, it has the same technical mechanism and technical effect with related methods described above, whose detail can be found in the description of the above embodiments, and will not be repeated here.

When in use, the device for warning against vehicle water wading of the present invention is disposed inside a vehicle to achieve the vehicle water wading warning.

As should be understood, in the various embodiments of the present invention, the disclosed systems, devices, and methods can be implemented through other ways. For example, the embodiments of the devices described above are merely illustrative. For example, the division of the units is only a logical functional division, the division may be done in other ways in actual implementations.

The units described as separate members may be or may be not physically separated, the components shown as units may or may not be physical units, which can be located in one place, or distributed in a number of network units. One can select some or all of the units to achieve the purpose of the embodiments according to the embodiment of the actual needs.

Further, in the embodiment of the present invention, the functional units in each embodiment may be integrated in a processing unit, or each unit may be a separate physical existence, or two or more units can be integrated in one unit. The integrated units described above can be used both in the form of hardware, or in the form of software plus hardware.

The aforementioned integrated unit implemented in the form of software may be stored in a computer readable storage medium. Said functional units of software are stored in a storage medium, including a number of instructions to instruct a computer device (it may be a personal computer, server, or network equipment, etc.) or processor to perform some steps of the method described in various embodiments of the present invention. The aforementioned storage medium includes: U disk, removable hard disk, read-only memory (ROM), a random access memory (RAM), magnetic disk, or an optical disk medium that may store program code.

The foregoing are only preferred embodiments of the present invention, not intended to limit the present invention, any modifications, equivalent substitutions and improvements made within the spirit and principles of the present invention should be included in the present invention.

I claim:

1. A method for warning against vehicle water wading, wherein the method comprises:

measuring a water depth at a predetermined distance in front of a vehicle, based on respective measuring results of a vehicle bottom laser rangefinder, an ultrasonic rangefinder, a vehicle roof laser rangefinder, and a gyro sensor;

determining whether the water depth exceeds a safe depth of the vehicle;

issuing a vehicle warning message if the water depth exceeds the safe depth.

2. The method according to claim 1, wherein before the step of measuring a water depth at a predetermined distance in front of a vehicle, based on respective measuring results of a vehicle bottom laser rangefinder, an ultrasonic rangefinder, a vehicle roof laser rangefinder, and a gyro sensor, the method further comprises:

measuring, with the vehicle bottom laser rangefinder, a first distance between the vehicle bottom laser rangefinder and the surface of the road, the vehicle bottom laser rangefinder being arranged at the bottom of the vehicle, and the laser beam down from the vehicle bottom laser rangefinder being emitted perpendicular to the bottom of the vehicle;

measuring, with the ultrasonic rangefinder, a second distance between the ultrasonic rangefinder and the surface of the water, the ultrasonic rangefinder being also arranged at the bottom of the vehicle, and the ultrasonic wave down from the ultrasonic rangefinder being also emitted perpendicular to the bottom of the vehicle, and the vehicle bottom laser rangefinder and the ultrasonic rangefinder being arranged in a straight line parallel to the front of the vehicle;

measuring, with the vehicle roof laser rangefinder, a third distance between the vehicle roof laser rangefinder and the surface of the road ahead at the predetermined distance, the laser beam from the vehicle roof laser rangefinder forming a certain angle with the perpendicular direction of the vehicle;

measuring, with the gyro sensor, the slope angle of the road, the gyro sensor being arranged in the vehicle;

wherein the step of measuring a water depth at a predetermined distance in front of a vehicle, based on respective measuring results of a vehicle bottom laser rangefinder, an ultrasonic rangefinder, a vehicle roof laser rangefinder, and a gyro sensor specifically comprises:

measuring the water depth at the predetermined distance in front of the vehicle based on the first distance, the second distance, the third distance, a fourth distance between the projection of vehicle roof laser rangefinder in the bottom of the vehicle and the straight line where the vehicle bottom laser rangefinder and the ultrasonic rangefinder are arranged, the slope angle, and the angle between the laser beam from the vehicle roof laser rangefinder and the perpendicular direction of the vehicle.

3. The method according to claim 2, wherein the step of measuring the water depth at the predetermined distance in front of the vehicle based on the first distance, the second distance, the third distance, a fourth distance between the projection of vehicle roof laser rangefinder in the bottom of the vehicle and the straight line where the vehicle bottom laser rangefinder and the ultrasonic rangefinder are arranged, the slope angle, and the angle between the laser beam from the vehicle roof laser rangefinder and the perpendicular direction of the vehicle specifically comprises:

- calculating, based on the first distance and the second distance, a first reference distance $L1=X1-X2$, in which $X1$ is the first distance and $X2$ is the second distance;
- calculating, based on the first distance $L1$ and the slope angle, a second reference distance $L2=L1/\tan\theta$, in which $\theta$ is the slope angle;
- calculating, based on the third distance and the angle between the laser beam from the vehicle roof laser rangefinder and the perpendicular direction of the vehicle, a third reference distance $L3$, $L3=X3/\sin\theta_1$, in which $X3$ is the third distance, and $\theta_1$ is the angle between the laser beam from the vehicle roof laser rangefinder and the perpendicular direction of the vehicle;
- calculating, based on the $L2/(L3-X4)=L1/L4$, a fourth reference distance $L4$, in which $X4$ is the fourth distance between the projection of vehicle roof laser rangefinder in the bottom of the vehicle and the straight line where the vehicle bottom laser rangefinder and the ultrasonic rangefinder are arranged;
- calculating, based on the fourth reference distance $L4$ and the slope angle, the water depth at the predetermined distance in front of the vehicle $L0=L4\times\cos\theta$.

4. The method according to claim 1, wherein the step of issuing a vehicle warning message comprises:

issuing a vehicle warning message in the form of voice.

5. The method according to claim 1, wherein, after the step of issuing a vehicle warning message, the method further comprises at least one of the following operations:

- controlling the vehicle to stop moving ahead; and
- broadcasting the vehicle warning message via a vehicle network broadcasting module, so as to inform other vehicles about the vehicle warning message.

6. A device for warning against vehicle water wading, wherein the device comprises:

- at least one processor; and
- a memory storing instructions, which when executed by the at least one processor, cause the at least one processor to perform operations, the operations comprising:
- measuring a water depth at a predetermined distance in front of a vehicle, based on respective measuring results of a vehicle bottom laser rangefinder, an ultrasonic rangefinder, a vehicle roof laser rangefinder, and a gyro sensor;
- determining whether the water depth exceeds a safe depth of the vehicle;
- issuing a vehicle warning message if the water depth exceeds the safe depth.

7. The device according to claim 6, wherein before the operation of measuring a water depth at a predetermined distance in front of a vehicle, based on respective measuring results of a vehicle bottom laser rangefinder, an ultrasonic rangefinder, a vehicle roof laser rangefinder, and a gyro sensor, the operations further comprises:

- measuring, with the vehicle bottom laser rangefinder, a first distance between the vehicle bottom laser rangefinder and the surface of the road, the vehicle bottom laser rangefinder being arranged at the bottom of the vehicle, and the laser beam down from the vehicle bottom laser rangefinder being emitted perpendicular to the bottom of the vehicle;
- measuring, with the ultrasonic rangefinder, a second distance between the ultrasonic rangefinder and the surface of the water, the ultrasonic rangefinder being also arranged at the bottom of the vehicle, and the ultrasonic wave down from the ultrasonic rangefinder being also emitted perpendicular to the bottom of the vehicle, and the vehicle bottom laser rangefinder and the ultrasonic rangefinder being arranged in a straight line parallel to the front of the vehicle;
- measuring, with the vehicle roof laser rangefinder, a third distance between the vehicle roof laser rangefinder and the surface of the road ahead at the predetermined distance, the laser beam from the vehicle roof laser rangefinder forming a certain angle with the perpendicular direction of the vehicle;
- measuring, with the gyro sensor, the slope angle of the road, the gyro sensor being arranged in the vehicle;
- wherein the operation of measuring a water depth at a predetermined distance in front of a vehicle, based on respective measuring results of a vehicle bottom laser rangefinder, an ultrasonic rangefinder, a vehicle roof laser rangefinder, and a gyro sensor specifically comprises:
- measuring the water depth at the predetermined distance in front of the vehicle based on the first distance, the second distance, the third distance, a fourth distance between the projection of vehicle roof laser rangefinder in the bottom of the vehicle and the straight line where the vehicle bottom laser rangefinder and the ultrasonic rangefinder are arranged, the slope angle, and the angle between the laser beam from the vehicle roof laser rangefinder and the perpendicular direction of the vehicle.

8. The device according to claim 7, wherein the operation of measuring the water depth at the predetermined distance in front of the vehicle based on the first distance, the second distance, the third distance, a fourth distance between the projection of vehicle roof laser rangefinder in the bottom of the vehicle and the straight line where the vehicle bottom laser rangefinder and the ultrasonic rangefinder are arranged, the slope angle, and the angle between the laser beam from the vehicle roof laser rangefinder and the perpendicular direction of the vehicle specifically comprises:

- calculating, based on the first distance and the second distance, a first reference distance $L1=X1-X2$, in which $X1$ is the first distance and $X2$ is the second distance;
- calculating, based on the first distance $L1$ and the slope angle, a second reference distance $L2=L1/\tan\theta_1$, in which $\theta$ is the slope angle;
- calculating, based on the third distance and the angle between the laser beam from the vehicle roof laser rangefinder and the perpendicular direction of the vehicle, a third reference distance $L3$, $L3=X3/\sin\theta_1$, in which $X3$ is the third distance, and $\theta_1$ is the angle between the laser beam from the vehicle roof laser rangefinder and the perpendicular direction of the vehicle;
- calculating, based on the $L2/(L3-X4)=L1/L4$, a fourth reference distance $L4$, in which $X4$ is the fourth distance between the projection of vehicle roof laser rangefinder in the bottom of the vehicle and the straight line where the vehicle bottom laser rangefinder and the ultrasonic rangefinder are arranged;

calculating, based on the fourth reference distance L4 and the slope angle, the water depth at the predetermined distance in front of the vehicle L0=L4×cos θ.

9. The device according to claim 6, wherein the operation of issuing a vehicle warning message comprises:

issuing a vehicle warning message in the form of voice.

10. The device according to claim 6, wherein, after the operation of issuing a vehicle warning message, the operations further comprise at least one of the following:

controlling the vehicle to stop moving ahead; and broadcasting the vehicle warning message via a vehicle network broadcasting module, so as to inform other vehicles about the vehicle warning message.

11. A computer storage medium, wherein the computer storage medium is coded with a computer program, and when the program is executed by one or more computers, the one or more computers perform the following operations:

measuring a water depth at a predetermined distance in front of a vehicle, based on respective measuring results of a vehicle bottom laser rangefinder, an ultrasonic rangefinder, a vehicle roof laser rangefinder, and a gyro sensor;

determining whether the water depth exceeds a safe depth of the vehicle;

issuing a vehicle warning message if the water depth exceeds the safe depth.

\* \* \* \* \*